United States Patent [19]

Cossé

[11] Patent Number: 4,549,647

[45] Date of Patent: Oct. 29, 1985

[54] APPARATUS FOR THE TRANSFER OF ARTICLES BETWEEN TWO MACHINES

[75] Inventor: Lionel Cossé, Nantes, France

[73] Assignee: Biscuiterie Nantaise-BN, Nantes, France

[21] Appl. No.: 408,928

[22] Filed: Aug. 17, 1982

[30] Foreign Application Priority Data

Apr. 2, 1982 [FR] France ............................. 82 06004

[51] Int. Cl.$^4$ ............................................. B65G 47/26
[52] U.S. Cl. ..................................... 198/461; 198/577; 198/579; 198/594
[58] Field of Search ............... 198/444, 457, 460, 572, 198/575, 577, 579, 594, 598, 611, 725, 364, 599, 635, 637, 815, 461

[56] References Cited

U.S. PATENT DOCUMENTS

| 1,489,926 | 4/1924 | Burtchaell | 198/579 X |
| 3,001,635 | 9/1961 | Beiler | 198/364 |
| 3,139,971 | 7/1964 | Smoker | 198/364 |
| 3,370,693 | 2/1968 | Marsden | 198/815 X |
| 4,413,724 | 11/1983 | Fellner | 198/594 |

FOREIGN PATENT DOCUMENTS 2409351 9/1975 Fed. Rep. of Germany ...... 198/364

Primary Examiner—Joseph E. Valenza
Assistant Examiner—David A. Bucci
Attorney, Agent, or Firm—Frost & Jacobs

[57] ABSTRACT

Apparatus is disclosed for transferring solid articles such as biscuits, without changing their position or spacing, between an upstream machine discharging the articles at a constant speed for a downstream machine having a higher rated speed with short dwells. The articles are fed from the upstream machine to a first linear conveyor and a second, parallel linear conveyor feeds in the opposite direction the articles towards the downstream machine. A circular turntable or semicircular conveyor has a semicircular path of movement between the first and second conveyors for transferring the articles therebetween. The turntable or semicircular conveyor is mounted for translation on a carriage parallel to the first and second conveyors. The translatory speed of the turntable or semicircular conveyor is equal to one-half the difference of the displacement speeds of the first and second conveyors and the rotational speed of the turntable or semicircular conveyor is such that the tangential speed thereof is equal to one-half the sum of the displacement speeds of the first and second conveyors.

6 Claims, 6 Drawing Figures

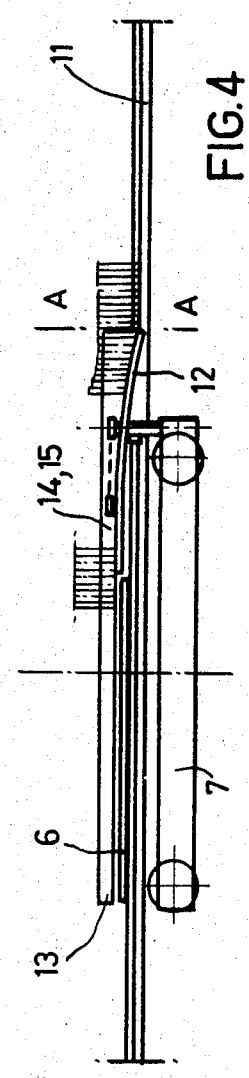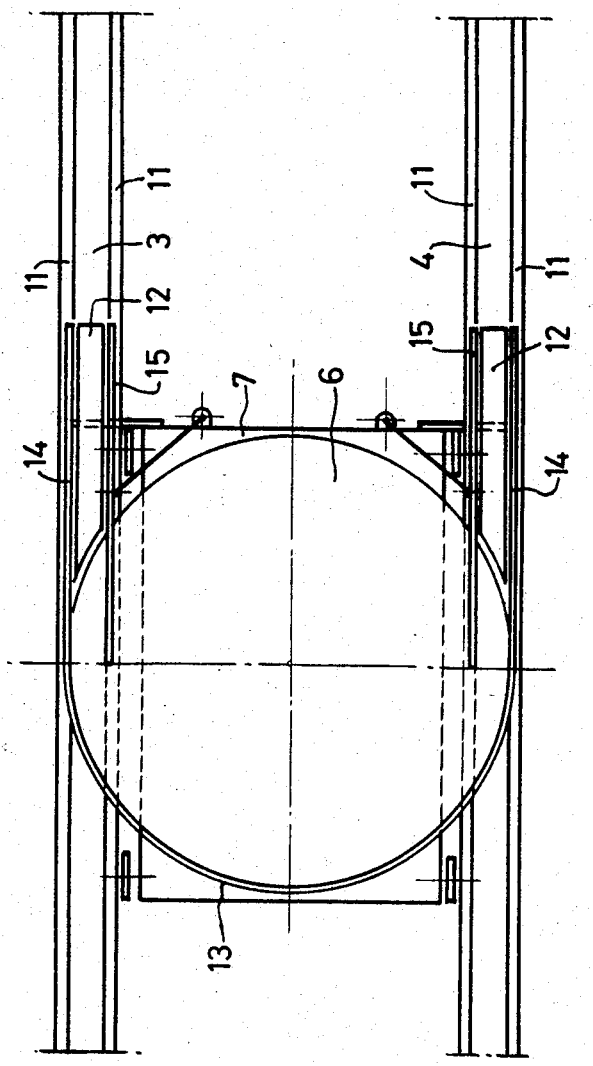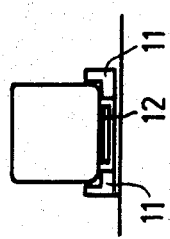

APPARATUS FOR THE TRANSFER OF ARTICLES BETWEEN TWO MACHINES

The present invention relates to apparatus for transferring without interruption solid products or articles of identical shape and size at a minimum constant spacing between an upstream machine discharging the products or articles continuously and a downstream machine operating at a higher speed but having short dwells.

In some fields of production line manufacture apparatus are known which are interposed between the upstream and downstream machines. The apparatus temporarily stores the products or articles exiting the upstream machine during the dwells of the downstream machine and discharges the products or articles during the operation of the downstream machine which has a rated operating speed greater than that of the upstream machine. In the field of manufacturing foodstuffs such as biscuits, cookies and crackers, hereinafter referred to as biscuits, the storage of a large quantity of biscuits for prolonged periods of time can not be envisaged. The dwells of the downstream machine must therefore be very short: it follows that the control device must be very flexible in operation to permit transfer without jarring or jolting the biscuits to avoid any damage to same. The dynamic storage apparatus generally comprise a set of conveyors one of which is connected to the upstream machine and the other to the downstream machine, the relative movements of the conveyors being controlled as a function of the upstream and downstream speeds.

According to U.S. patent application Ser. No. 343,058, now U.S. Pat. No. 4,469,219 assigned to the assignee of the present application the biscuits exiting the upstream machine are transferred flat, in line and at a constant maximum spacing. A reduction of the spacing between biscuits is effected by determining a change-of-spacing zone, then transporting the biscuits in line at a minimum constant spacing to the downstream machine. The presence of the biscuits is detected before the reduction of the spacing between biscuits and the change of spacing zone is displaced closer to one or the other machines as a function of their relative speeds. The reduction of the inter-biscuit spacing can also be carried out by straightening up the biscuits from their recumbent or flat position to a more or less inclined position or on an edge. The apparatus which performs such a method comprises an inlet endless belt conveyor operating at a speed adapted to the upstream machine speed and an outlet endless belt conveyor operating at a speed less than or equal to the speed of the inlet conveyor and adapted to the displacement speed of the downstream machine. The two conveyors are parallel to each other and preferably are horizontal, the downstream end of inlet conveyor partially overlaps the outlet conveyor, and the biscuits are transferred from one conveyor to the other by means of a chute moveable in translation with respct to the outlet conveyor. The displacements of the chute are produced by means of a differential device in cooperation with the means for driving the input and output conveyors. This type of apparatus is inoperative when the biscuits are proceeding with a constant space between one another at the outlet end of the upstream machine and the available length of the conveyor is constant.

According to the invention there is provided apparatus for the transfer of solid products or articles continuously discharged from the upstream machine toward a higher speed downstream machine having short dwells with the spacing between solid products or articles at the downstream machine being the same as the spacing between solid products or articles at the upstream machine.

According to a first aspect of the invention there is provided an apparatus for transferring solid products or articles of identical size and shape without changing their position or spacing, wherein the products or articles are discharged from an upstream machine at a constant speed for a downstream machine having a higher rated speed with short dwells, said apparatus comprising a first linear endless conveyor arranged horizontally and driven in the same direction and at the same speed as an inlet conveyor fed by the upstream machine, and a second linear endless conveyor arranged horizontally, and parallel to and in substantially the same plane as the first conveyor, the second conveyor being driven in the same direction and at the same speed as an outlet conveyor feeding the downstream machine, the first and second conveyors being driven for translation in opposite directions, interchange means for bringing the first and second conveyors into communication with each other, the interchange means lying close to the plane of the first and second conveyors, the first and second conveyors extending substantially tangentially to the interchange means, the interchange means defining an axis of rotation extending perpendicular to the plane, the interchange means being mounted for translatory movement parallel to the first and second conveyors, the translatory speed of the interchange means being equal to one-half the difference between the displacement speeds of the first and second conveyors, the rotational speed of the interchange means being such that the tangential speed of the interchange means is equal to one-half the sum of the displacement speeds of the first and second conveyors.

According to another aspect of the invention there is provided an apparatus for transferring solid products or articles of identical size and shape without changing their position or spacing, wherein the products or articles are discharged from an upstream machine at a constant speed for a downstream machine having a higher rated speed with short dwells, said apparatus comprising a first linear endless conveyor arranged horizontally and driven in the same direction and at the same speed as the inlet conveyor fed by the upstream machine, and a second linear endless conveyor arranged horizontally, and parallel to and in substantially the same plane as the first conveyor, the first and second conveyors being driven for translation in opposite directions, a circular turntable or semicircular conveyor for bringing the first and second conveyors into communication with eath other, the circular turntable or semicircular conveyor lying close to the same of the first and second conveyors, the circular turntable or semicircular conveyor defining an axis of rotation extending perpendicular to the plane, the circular turntable or semicircular conveyor being mounted for translatory movement parallel to the first and second conveyors, the translatory speed of the circular turntable or semicircular conveyor being equal to one-half the difference between the displacement speeds of the first and second conveyors, the rotational speed of the circular turntable or the semicircular conveyor being such that the tangential speed of the circular turntable or semicircular conveyor is equal to one-half the sum of the displacement speeds of the first and second conveyors.

The invention will be better understood with reference to the description which follows and the attached drawings which illustrate an embodiment of the apparatus in conformity with the present invention.

In the drawings:

FIG. 4 is a sectional elevational view of the access means for articles to the circular turntable of the FIG. 2 embodiment;

FIG. 5 is a top view corresponding to FIG. 4; and

FIG. 6 is a sectional view taken along line A—A in FIG. 4 at the admission end of the ingress means for articles.

Figure 1:
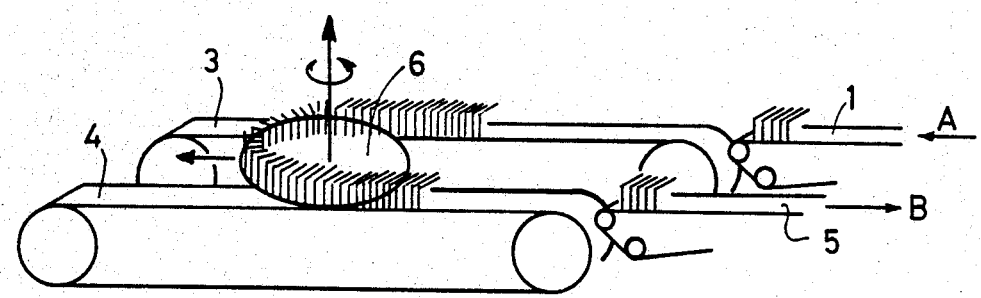
FIG. 1 is a schematic perspective view of the apparatus.
Figure 2:
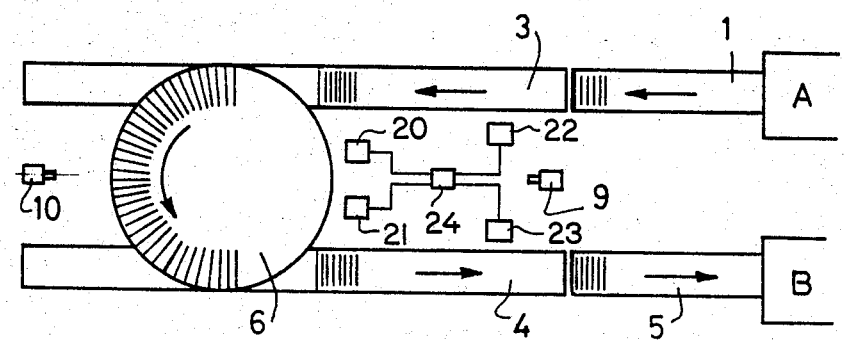
FIG. 2 is a simplified top view of the apparatus having an interchange means comprising a circular turntable.

As shown, the apparatus is positioned, in the illustrated embodiment, between a station A corresponding, for example, to an oven for baking biscuits, cookies or crackers, hereinafter biscuits, and a station B corresponding, for example, to a machine for packaging the biscuits. The packaging machine has, in general, short dwells which are due, for example, to the forming of the packages.

The biscuits leaving the oven are transported by an inlet linear conveyor 1 into the actual apparatus. The apparatus comprises a frame having a first linear belt-type endless conveyor 3 disposed in alignment with the inlet conveyor 1 and driven in the same direction and at the same speed as the latter. The apparatus also comprises a second linear belt-type endless conveyor 4 parallel to conveyor 3 and lying in the same horizontal plane therewith. The second conveyor 4 supplies a so-called outlet conveyor 5 driven in the same direction and at the same speed as the second conveyor 4, the outlet conveyor supplying biscuits to station B.

In the illustrated embodiment the first and second conveyors 3 and 4 on the frame are driven for translation in opposite directions and are brought into communication by semicircular interchange means comprising a circular turntable 6 located close to the horizontal plane of the first and second conveyors and arranged substantially tangentially to the first and second conveyors 4 and 5. The circular turntable 6 is driven in rotational movement, by motor 20, about an axis perpendicular to the plane through the center of the circular turntable.

To ensure continuity of the transfer of the biscuits from station A at a speed assumed to be constant and without interruptions, and taking into account that the displacement speed of conveyors 4 and 5 which is greater than that of conveyor 3 may vary, decrease or reach zero, the speed of rotation of the turntable 6 is variable. The speed of rotation of the turntable 6 must necessarily be coordinated with those of conveyors 3 and 4 (whose speeds are detected by sensors 22 and 23), simultaneously with translational speed of the turntable which is driven by motor 21 in a direction parallel to the conveyors 3 and 4. To this end the turntable is mounted on a carriage 7 displaceable along tracks fixed to the frame. The translatory drive by motor 20 and the rotational drive by motor 21 for the turntable 6 have speeds adapted to the speeds of displacement of the conveyors 3 and 4 by a known type of differential means such as a comparator-calculator control 24.

In order to permit the storage of a large number of biscuits on the conveyor B at the time of a slowup of the speed of the conveyor 4 or in case of a relatively long stoppage thereof, the length of the frame must be sufficient to permit translatory displacements of the turntable carriage 7. Because the transferring of the biscuits must be carried out with constant biscuit spacing between the succession of biscuits, any slipping between the conveyors 3 and 4 and the turntable 6 must be prevented. This makes the apparatus analogous to a differential means wherein the two conveyors may be compared to two racks and the turntable 6 may be compared to a pinion or planet gear which meshes with the two racks. The translation of the pinion is thus equal to half the difference of the speeds of displacement of the conveyors. Likewise, by analogy with the angular velocity of the planet gear with that of a sun gear, the tangential velocity of the turntable must be equal to half the sum of the translatory speeds of displacement of the conveyors 3 and 4, that is to say, the incoming and outgoing speeds of the biscuits at the turntable.

Figure 3:
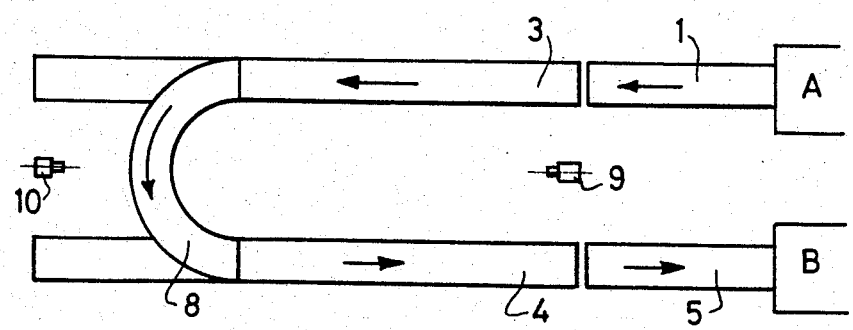
FIG. 3 shows a top view of an alternative embodiment in which the interchange means comprises a semicircular conveyor.

FIG. 3 shows an alternative embodiment of the invention in which the semicircular interchange means for bringing the conveyors 3 and 4 into communication comprises an endless conveyor 8 having a semicircular pathway carried by the carriage 7 and disposed in a substantially horizontal plane, the inlet and outlet ends of the semicircular conveyor 8 being in alignment with the corresponding conveyors 3 and 4. As in the case of the preceding embodiment, the speed of translation of the carriage 7 and speed of the displacement of the semicircular conveyor 8 are in the same proportion as the speeds of displacement of the first conveyor 3 and the second conveyor 4 of the apparatus.

For safety's sake the apparatus comprises two limit switches 9 and 10 limiting the translatory displacements of the carriage 7. In normal operation, since the speed of displacement of conveyor 4 is greated than that of conveyor 3, the carriage 7 is displaced toward the stations A and B up to contact with limit switch 9 which controls the driving of the conveyors 3 and 4 to stop the same. The biscuits then stack up on the conveyor 3 as the carriage 7 is displaced away from stations A and B. In case of prolonged stoppage of the downstream machine, the carriage 7 comes into contact with switch 10 which stops the conveyors 1 and 3. The estimated length of the stoppage of the downstream machine and the length of the frame 2 as a function of estimate are such that in normal operation, the carriage 7 only rarely reaches the limit switch 10, since the upstream machine should only be stopped in case of real necessity.

FIGS. 4, 5 and 6 illustrate means for ingress and egress of biscuits to and from the circular turntable 6. The biscuits are supported on the conveyors with their lower corners bearing on the rabbets of two lateral brackets 11 with which the conveyors are equipped, such an arrangement leaving a free space between the belt of the conveyor and the biscuits. The biscuits have access to the circular turntable 6 by ingress means comprising an inclined surface or ramp 12 formed by a strip included between the inner sidewalls of the lateral backets 11 and beneath the biscuits. The inclined surface or ramp 12 is fixed to the carriage 7. The upper part of the inclined surface or ramp 12 is at the level of the turntable 6 and immediately juxtaposed thereto. The lateral guiding of the biscuits is ensured by means of an outer semicircular guide 13 running along the periphery of the turntable which is extended by two outer longitudinal guides 14. Similarly, two inner longitudinal guides 15 parallel to the two outer longitudinal guides 14 are also provided. All the guides are fixed to the carriage 7.

In the alternative embodiment with the interchange means comprising a semicircular conveyor ingress and egress means for biscuits may be provided in the same manner.

The invention is not limited to the illustrated and described embodiments, but encompasses all alternatives and variations understood to those skilled in the art without departing from the scope of the appended claims.

The apparatus according to the invention may be used for the transfer of all solid articles and products of identical shapes and sizes with a constant spacing arrangement.

What I claim is:

1. An apparatus for transferring solid articles of identical size and shape without changing their position or spacing relative to each other, the articles being discharged from an upstream machine at a first constant speed to a downstream machine having a second speed which can differ from said first speed, said apparatus comprising a first linear endless conveyor arranged approximately horizontally and driven in the same direction and at the same speed as an inlet conveyor fed by the upstream machine, a second linear endless conveyor driven by variable speed means arranged approximately horizontal and parallel to and in substantially the same plane as the first linear conveyor, said second linear conveyor being driven in the same direction and at the same speed as an outlet conveyor feeding the downstream machine, the first and second linear conveyors being driven for translation in opposite directions, interchange means for bringing said first and second linear conveyors into communication with each other, said interchange means lying close to the same plane as the said first and second linear conveyors, said first and second linear conveyors extending substantially tangentially to said interchange means, said interchange means defining an axis of rotation extending perpendicular to said plane, said interchange means being mounted for translatory movement parallel to said first and second linear conveyors, and controlled by the relationship in speeds between said first and second linear conveyors, said interchange means being driven at a translatory speed equal to one-half the difference between the displacement speeds of said first and second conveyors, and said interchange means being rotationally driven at a speed such that the tangential speed of the articles conveyed by said interchange means is equal to one-half the sum of the displacement speeds of said first and second conveyors.

2. The apparatus of claim 1, wherein said interchange means comprise a semicircular path of movement for articles between said first and second conveyors.

3. The apparatus of claim 1 or 2, wherein said interchange means comprises a circular turntable with said axis of rotation at the center of said circular turntable.

4. The apparatus of claim 1 or 2, wherein said interchange means comprises a semicircular conveyor interconnecting said first and second conveyors the center of curvature of said semicircular conveyor coinciding with said axis of rotation.

5. The apparatus of claim 1 or 2, wherein said interchange means is mounted on a carriage for translatory movement on tracks, limit switches at opposite ends of said tracks for stopping the downstream and the upstream conveyor, respectively, when said carriage reaches a corresponding end of said tracks.

6. The apparatus of claim 1 or 2, wherein said first and second conveyors are belt conveyors, lateral brackets being provided on said first and second conveyors for supporting the articles and defining a space between the corresponding one of said first and second conveyors and the articles thereon, and ingress and egress means for said interchange means each comprising an inclined surface, the lower end of said inclined surface being disposed in the space between said brackets and said one conveyor, the upper end of said inclined surface being at the level of said interchange means and immediately juxtaposed thereto, means for laterally guiding the articles comprising an outer semicircular guide running along the outer periphery of said interchange means and extended by two outer longitudinal guides, and two inner longitudinal guides parallel to the outer longitudinal guides, all of said guides being fixed for movement with means mounting said interchange means for translatory movement.

* * * * *